United States Patent [19]

Buschhoff et al.

[11] Patent Number: 4,988,750

[45] Date of Patent: Jan. 29, 1991

[54] NON-TOXIC STABILIZER FOR HALOGENATED POLYMER

[75] Inventors: Max Buschhoff, Luenen; Hans Plum, Hamm; Karl-Heinz Mueller, Werne, all of Fed. Rep. of Germany

[73] Assignee: Schering AG, Berlin and Bergkamen, Fed. Rep. of Germany

[21] Appl. No.: 907,127

[22] Filed: Sep. 11, 1986

Related U.S. Application Data

[63] Continuation of Ser. No. 726,954, Apr. 26, 1985, abandoned, which is a continuation of Ser. No. 587,865, Mar. 12, 1984, abandoned, which is a continuation of Ser. No. 524,466, Aug. 18, 1983, abandoned, which is a continuation of Ser. No. 435,609, Oct. 19, 1982, abandoned, which is a continuation of Ser. No. 284,196, Jul. 17, 1981, abandoned.

[51] Int. Cl.⁵ .................................................. C08K 5/58
[52] U.S. Cl. .................................... 524/181; 124/180; 252/400.1
[58] Field of Search ............................ 524/180, 181; 252/401.1

[56] References Cited

U.S. PATENT DOCUMENTS

| | | | |
|---|---|---|---|
| 2,648,650 | 11/1953 | Weinberg | 524/180 |
| 2,713,585 | 7/1955 | Best | 524/180 |
| 2,731,440 | 1/1956 | Stefl et al. | 524/180 |
| 2,832,751 | 4/1958 | Weinberg et al. | 524/180 |
| 2,868,765 | 1/1959 | Haefner et al. | 524/180 |
| 3,063,963 | 11/1962 | Wooten et al. | 524/180 |
| 3,147,285 | 9/1964 | Mack | 524/180 |
| 3,370,075 | 2/1968 | Parker | 524/180 |
| 3,478,071 | 11/1969 | Weisfeld | 524/180 |
| 3,534,121 | 10/1970 | Eggensperger et al. | 260/880 |
| 3,632,538 | 1/1972 | Kauder | 524/180 |
| 3,640,947 | 2/1972 | Gloskey | 524/180 |
| 3,657,294 | 4/1972 | Gloskey | 524/180 |
| 3,764,571 | 10/1973 | Jennings et al. | 524/180 |
| 3,810,868 | 5/1974 | Weisfeld | 524/180 |
| 4,193,913 | 3/1980 | Abeler | 524/180 |

FOREIGN PATENT DOCUMENTS

| | | |
|---|---|---|
| 0000746 | 2/1979 | European Pat. Off. . |
| 0002007 | 9/1979 | European Pat. Off. . |
| 0034118 | 2/1981 | European Pat. Off. . |
| 0032106 | 7/1981 | European Pat. Off. . |
| 0082582 | 6/1983 | European Pat. Off. . |
| 0011456 | 9/1983 | European Pat. Off. . |
| 0109546 | 10/1983 | European Pat. Off. . |
| 1269236 | 7/1961 | Fed. Rep. of Germany . |
| 1494296 | 3/1962 | Fed. Rep. of Germany . |
| 1226578 | 10/1966 | Fed. Rep. of Germany . |
| 1270799 | 6/1968 | Fed. Rep. of Germany . |
| 275162 | 1/1969 | Fed. Rep. of Germany . |
| 1469941 | 2/1969 | Fed. Rep. of Germany . |
| 1494333 | 2/1969 | Fed. Rep. of Germany . |
| 1494225 | 3/1969 | Fed. Rep. of Germany . |
| 1295838 | 5/1969 | Fed. Rep. of Germany . |
| 1801274 | 5/1969 | Fed. Rep. of Germany . |
| 1801275 | 5/1969 | Fed. Rep. of Germany . |
| 1801277 | 5/1969 | Fed. Rep. of Germany . |
| 1806494 | 6/1969 | Fed. Rep. of Germany . |
| 1813994 | 7/1969 | Fed. Rep. of Germany . |
| 1815168 | 9/1969 | Fed. Rep. of Germany . |
| 1900170 | 9/1969 | Fed. Rep. of Germany . |
| 1494278 | 11/1969 | Fed. Rep. of Germany . |
| 1568297 | 1/1970 | Fed. Rep. of Germany . |
| 1924858 | 1/1970 | Fed. Rep. of Germany . |
| 1934188 | 1/1970 | Fed. Rep. of Germany . |
| 71359 | 2/1970 | Fed. Rep. of Germany . |
| 1544906 | 4/1970 | Fed. Rep. of Germany . |
| 1926949 | 4/1970 | Fed. Rep. of Germany . |
| 1669899 | 7/1970 | Fed. Rep. of Germany . |
| 2005290 | 8/1970 | Fed. Rep. of Germany . |
| 1544907 | 9/1970 | Fed. Rep. of Germany . |
| 2005291 | 9/1970 | Fed. Rep. of Germany . |
| 2024089 | 12/1970 | Fed. Rep. of Germany . |
| 1958744 | 2/1971 | Fed. Rep. of Germany . |
| 1643786 | 4/1971 | Fed. Rep. of Germany . |
| 2046203 | 4/1971 | Fed. Rep. of Germany . |
| 2064396 | 7/1971 | Fed. Rep. of Germany . |
| 1694936 | 10/1971 | Fed. Rep. of Germany . |
| 1768208 | 11/1971 | Fed. Rep. of Germany . |
| 1643886 | 4/1972 | Fed. Rep. of Germany . |
| 1669989 | 4/1972 | Fed. Rep. of Germany . |
| 2148774 | 4/1972 | Fed. Rep. of Germany . |
| 1669841 | 6/1972 | Fed. Rep. of Germany . |
| 2208512 | 8/1972 | Fed. Rep. of Germany . |
| 2238148 | 3/1973 | Fed. Rep. of Germany . |
| 2318554 | 10/1973 | Fed. Rep. of Germany . |
| 2420061 | 10/1974 | Fed. Rep. of Germany . |

OTHER PUBLICATIONS

Kunstoffe, vol. 71, May, 1981, pp. 315–320.
Abeler et al., "Synergism of Mono and Di-Organotin Compounds", German Plastics, May, 1981, pp. 25 to 28.
J. G. A. Luijten et al., "Tin In Chemistry-Organic and Inorganic Tin Compounds", 18th German Tin Meeting, Tin Research Institute Pub. (Middlesex England), Paper Presented Nov. 15, 1973 at VDI-Hause, Dosseldorf, Germany.

Primary Examiner—Veronica P. Hoke
Attorney, Agent, or Firm—Curtis, Morris & Safford

[57] ABSTRACT

What are disclosed are a non-toxic stabilizer mixture for a molding compound comprising a halogenated polymer, said stabilizer mixture comprising about 40 percent by weight of a didodecyltin-bis-thioglycolic acid ester of the formula

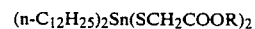

and about 60 percent by weight of a dodecyltin-tristhioglycolic acid ester of the formula

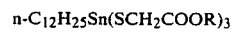

wherein R is a straight-chain or branched-chain alkyl having 8 to 20 carbon atoms, a method for stabilizing a halogenated molding compound with such a stabilizer mixture, and a stabilized molding compound comprising such a stabilizer mixture.

7 Claims, Drawing Sheet

NON-TOXIC STABILIZER FOR HALOGENATED POLYMER

This is a continuation of prior application Ser. No. 726,954, filed on Apr. 26, 1985, now abandoned, which is a continuation of Ser. No. 587,865 filed Mar. 12, 1984, now abandoned; which is a continuation of Ser. No. 524,466 filed Aug. 18, 1983, now abandoned; which is a continuation of Ser. No. 435,609 filed Oct. 19, 1982, now abandoned; which is a continuation of Ser. No. 284,196 filed July 17, 1981, now abandoned.

The present invention relates to a non-toxic stabilizer mixture for molding compounds which comprise halogenated polymers, particularly for those polymers which are used as packaging materials for foodstuffs and medical or pharmaceutical goods.

According to the invention, the stabilizer mixture comprises about 40 percent by weight of a didodecyltin-bisthioglycolic acid ester of the formula $$(n\text{-}C_{12}\text{-}H_{25})_2Sn(SCH_2COOR)_2$$

and about 60 percent by weight of the corresponding monoalkyltin compound, i.e. of a dodecyltin-tris-thioglycolic acid ester of the formula $$n\text{-}C_{12}H_{25}Sn(SCH_2COOR)_3,$$

wherein R is linear or branched alkyl having from 8 to 20 carbon atoms, particularly 2-ethylhexyl (i.e. isooctyl).

The use of organotin stabilizers to stabilize halogenated polymers, particularly polyvinyl chloride (PVC) and copolymers containing PVC, against the effects of light and heat is known in the art.

Conventional stabilizers, such as dibutyltin thioglycolates or dioctyltin thioglycolates, particularly in admixture with the corresponding monoalkyltin compounds, show a particularly good synergistic effect, from the point of view of stabilizing action, at a content of about 25 to 30 percent by weight of the monoalkyltin component.

It has now been found that, in contrast, in mixtures of bis-dodecyltin thioglycolates with the corresponding monoalkyltin compound, an improved stabilization effect is achieved with a mixture containing a considerably higher monoalkyltin content and that the mixture according to the present invention exhibits an optimum effect (cf. the Table later herein).

As is evident from the Table, the stabilizing effect of the synergistic mixture according to the invention is considerably better in emulsion polyvinylchloride (E-PVC) than are comparative stabilizing materials. Also in suspension polyvinylchloride (S-PVC), the stabilizing effect is greater than the comparison values.

The outstanding heat-stabilizing effect of the stabilizer mixture according to the present invention is all the more surprising because the tin content thereof, for example at 13.4 percent in a stabilizer mixture according to the invention having an isooctyl thioglycolate group, is considerably below that of the comparison stabilizer, which contains 17.5 percent of tin. If the alkyl-chain of the ester group is lengthened, the stabilizing effect of the dodecyltin stabilizer mixture according to the present invention decreases only insignificantly, despite the still-lower tin content (11.5 percent in mixtures containing dodecyl thioglycolate and 9 percent in mixtures containing tetradecyl thioglycolate). Heretofore, it has been true for all known organotin stabilizers that the stabilizing effect essentially was dependent on the tin content, i.e. with lower tin content the effect clearly decreases.

The stabilizer mixture according to the present invention has the further advantage that it has still-lower toxicity values in comparison with the common organotin stabilizers and because of this can be classified as non-toxic.

Thus, the lethal doses ($LD_{50}$) for rats are:

| | |
|---|---|
| $(C_4H_9)_2SnTh_2$ (Commercial product containing about 25% of monoalkyltin compound) | = about 750 mg/kg |
| 40% $(C_{12}H_{25})_2SnTh_2$ + 60% $C_{12}H_{25}SnTh_3$ (Th = isooctyl thioglycolate) | = 4500 mg/kg |

Investigation of systemic tolerance after 12 weeks' administration to rats in their feed gave a very favorable "no effect" level of 600 parts per million. The "no effect" level of dibutyltin thioglycolate compounds, in contrast, is about 10 parts per million and is about 25 parts per million for the dioctyl compounds.

No influence on the lymphatic system of mammals could be determined even at high doses.

In inhalation studies with the stabilizer mixture of the present invention in rats, no acute inhalation risk could be determined.

In addition to a low toxicity for mammals, the migration of the stabilizer from PVC is significant: namely, the migration should understandably be as small as possible. It has been found that the migration of the stabilizer mixture according to the invention is very much lower than for other organotin stabilizers. It is less than 0.2 microgram of tin/$dm^2$ of a test film, in comparison with 5 microgram of tin/$dm^2$ for dioctyltin thioglycolates. In both cases, the stabilizer was used in an amount of 1.5 percent by weight in PVC.

Thus, from several points of view the stabilizer mixture of the present invention is particularly suitable for use in packaging materials comprising PVC homopolymers or copolymers, which packaging materials are used for packaging foodstuffs and pharmaceuticals, or for use in the medical field, for instance for the storage of blood or for plastic tubes for infusions, in which uses particularly low toxicity values are required.

The stabilizer mixture according to the present invention is non-toxic and, because of its extremely low migration in comparison to other organotin stabilizers, migrates in considerably smaller amounts in to packaged article. The amounts of stabilizer which are employed can be kept small, right from the beginning, because of the good stabilizing effect which they show.

Further, the stabilizer mixture according to the invention has little odor and exhibits low volatility. When many of the organotin stabilizers which are now commonly used are processed at elevated temperatures, personnel may be subjected to considerable stresses because of the liberated stabilizer. The stabilizer mixture according to the present invention does not have this disadvantage because of its high boiling point and its low vapor pressure.

The dodecyltin stabilizer components can be prepared according to known methods from the corresponding dodecyltin chlorides or dodecyltin oxides and thioglycolic acid esters.

The stabilizer mixture according to the invention can optionally be used with other known stabilizers, stabilizing auxiliaries, antioxidants, UV-stabilizers, lubricants, plasticizers, and the like. It is employed in amounts from 0.1–3, particularly 1–2, percent by weight of the polymer being stabilized.

A better understanding of the present invention and of its many advantages will be had by referring to the following specific Examples, given by way of illustration.

EXAMPLE 1

The heat-stabilizing effect of dodecyltin thioglycolate was investigated on a suspension-polymerized PVC (commercially available under the tradename "Vestolit S 7054") and on an emulsion polymerized PVC (commercially available under the tradename "Vestolit E 7003") with the aid of a stabilimeter with an automatic drive.

The test temperature was 185° C. 2 percent of a lubricant commercially available under the tradename "Naftolube Fol" were added As the stabilizer used for purposes of comparison, di-n-butyltin-bis-thioglycolic acid isooctyl ester having a content of 25 percent of mono-n-butyltin-tris-thioglycolic acid isooctyl ester, heretofore conventional in the art, was used. The tin content of this stabilizer was 17.5 percent.

In the formulas,

The = thioglycolic acid isooctyl ester except where otherwise noted.

TABLE

| Stabilizer | Emulsion PVC Time in minutes for formation of a dark color | Suspension PVC Time in minutes for formation of a dark color |
|---|---|---|
| 1% $(C_{12}H_{25})_2SnTh_2$ | 60 | 50 |
| 1% $C_{12}H_{25}SnTh_3$ | 60 | 50 |
| 0.8% $(C_{12}H_{25})_2SnTh_2$ + 0.2% $C_{12}H_{25}SnTh_3$ | 65 | 55 |
| 0.6% $(C_{12}H_{25})_2SnTh_2$ + 0.4% $C_{12}H_{25}SnTh_3$ | 70 | 55 |
| 0.4% $(C_{12}H_{25})_2SnTh_2$ + 0.6% $C_{12}H_{25}SnTh_3$ (stabilizer mixture according to the invention) | 80 | 65 |
| 0.2% $(C_{12}H_{25})_2SnTh_2$ + 0.8% $C_{12}H_{25}SnTh_3$ | 65 | 55 |
| 0.75% $(nC_4H_9)_2SnTh_2$ + 0.25% $nC_4H_9SnTh_3$ (comparison stabilizer) | 65 | 55 |
| (1) 0.4% $(C_{12}H_{25})_2SnTh_2$ + 0.6% $C_{12}H_{25}SnTh_3$ | 75 | 60 |
| (2) 0.4% $(C_{12}H_{25})_2SnTh_2$ + 0.6% $C_{12}H_{25}SnTh_3$ | 75 | 60 |
| (3) 0.4% $(C_{12}H_{25})_2SnTh_2$ + 0.6% $C_{12}H_{25}SnTh_3$ | 70 | 60 |
| (4) 0.4% $(C_{12}H_{25})_2SnTh_2$ + 0.6% $C_{12}H_{25}SnTh_3$ | 70 | 60 |

In (1), Th = thioglycolic acid tetradecyl ester;
in (2), Th = thioglycolic acid hexadecyl ester;
in (3), Th = thioglycolic acid decyl ester;
in (4), Th = thioglycolic acid dodecyl ester.

What is claimed is:

1. A non-toxic stabilizer mixture for a molding compound comprising a halogenated polymer, said stabilizer mixture comprising about 40 percent by weight of a didodecyltinbis-thioglycolic acid ester of the formula $$(n\text{-}C_{12}H_{25})_2Sn(SCH_2COOR)_2$$

and about 60 percent by weight of a dodecyltin-tris-thioglycolic acid ester of the formula $$n\text{-}C_{12}H_{25}Sn(SCH_2COOR)_3,$$

wherein R is straight-chain or branched-chain alkyl having 8 carbon atoms.

2. A mixture as in claim 1 wherein R is 2-ethylhexyl.

3. A method for stabilizing a molding compound comprising a halogenated polymer, which method comprises mixing with said polymer from 0.1–3 percent, by weight of said polymer, of a mixture as in claim 1.

4. A method as in claim 3 wherein R is 2-ethylhexyl.

5. A stabilized molding compound comprising a halogenated polymer and from 0.1–3 percent, by weight of said polymer, of a mixture as in claim 1 admixed with said polymer.

6. A stabilized molding compound as in claim 5 wherein R is 2-ethylhexyl.

7. A stabilized molding compound as in claim 5 wherein said halogenated polymer is a homopolymer or copolymer of polyvinyl chloride.

* * * * *